(12) United States Patent
Watzke et al.

(10) Patent No.: US 11,275,737 B2
(45) Date of Patent: Mar. 15, 2022

(54) ASSIGNMENT OF OBJECTS TO PROCESSING ENGINES FOR EFFICIENT DATABASE OPERATIONS

(71) Applicant: TERADATA US, INC., San Diego, CA (US)

(72) Inventors: Michael Warren Watzke, Fitchburg, WI (US); Bhashyam Ramesh, Secimderabad (IN)

(73) Assignee: Teradata US, Inc., San Diego, CA (US)

( * ) Notice: Subject to any disclaimer, the term of this patent is extended or adjusted under 35 U.S.C. 154(b) by 283 days.

(21) Appl. No.: 16/720,389

(22) Filed: Dec. 19, 2019

(65) Prior Publication Data
US 2021/0034626 A1 Feb. 4, 2021

Related U.S. Application Data

(60) Provisional application No. 62/882,316, filed on Aug. 2, 2019.

(51) Int. Cl.
*G06F 16/2455* (2019.01)
*G06F 16/28* (2019.01)
*G06F 9/50* (2006.01)

(52) U.S. Cl.
CPC ...... *G06F 16/24557* (2019.01); *G06F 9/5066* (2013.01); *G06F 16/285* (2019.01)

(58) Field of Classification Search
CPC . G06F 16/24557; G06F 16/285; G06F 9/5066
USPC .......................................... 707/737
See application file for complete search history.

(56) References Cited

PUBLICATIONS

Wikipedia, Microsoft Azure last edited Nov. 22, 2019 (8 pages).
Wikipedia, Google Storage last edited Nov. 2, 2019 (2 pages).
Wikipedia, Amazon S3 last edited Nov. 26, 2019 (8 pages).

*Primary Examiner* — Dung K Chau
(74) *Attorney, Agent, or Firm* — Trop, Pruner & Hu P.C.

(57) ABSTRACT

In some examples, a system stores data in a logically disconnected data store. In response to a query for data in the data store, the system accesses metadata of objects stored in the data store, the metadata including information of a respective range of values of at least one clustering attribute in data contained in each respective object of the objects. The system partitions the objects across the plurality of processing engines based on the information of the respective ranges of values of the at least one clustering attribute in the data contained in the objects. The system assigns, based on the partitioning, the objects to respective processing engines of the plurality of processing engines.

20 Claims, 5 Drawing Sheets

OBJECT INDEX METADATA
126

| OBJECT | MIN | MAX | |
|---|---|---|---|
| 1 | 1 | 201 | 302-1 |
| 2 | 202 | 408 | 302-2 |
| 3 | 408 | 609 | 302-3 |
| 4 | 625 | 802 | 302-4 |
| 5 | 810 | 950 | 302-5 |
| 6 | 2 | 300 | 302-6 |
| 7 | 301 | 504 | 302-7 |
| 8 | 509 | 700 | 302-8 |
| 9 | 712 | 830 | 302-9 |
| 10 | 850 | 999 | 302-10 |

FIG. 3

SORTED OBJECT INDEX METADATA
208

| OBJECT | MIN | MAX | UOP (404) | DUPLICATE (406) | |
|---|---|---|---|---|---|
| 1 | 1 | 201 | 1 | N | 402-1 |
| 6 | 2 | 300 | 1 | N | 402-2 |
| 2 | 202 | 408 | 1 | N | 402-3 |
| 7 | 301 | 504 | 1 | N | 402-4 |
| 3 | 408 | 609 | 1 | Y READ > 559 BY UOP 2 | 402-5 |
| 8 | 509 | 700 | 2 | Y READ <= 559 BY UOP 1 | 402-6 |
| 4 | 625 | 802 | 2 | N | 402-7 |
| 9 | 712 | 830 | 2 | N | 402-8 |
| 5 | 810 | 950 | 2 | N | 402-9 |
| 10 | 850 | 999 | 2 | N | 402-10 |

214
UOP OBJECT ADJUSTMENT LIST

FIG. 4

ASSIGNMENT OF OBJECTS TO PROCESSING ENGINES FOR EFFICIENT DATABASE OPERATIONS

CROSS REFERENCE TO RELATED APPLICATION

This application claims the benefit of U.S. Provisional Application No. 62/882,316, filed Aug. 2, 2019, which is hereby incorporated by reference in its entirety.

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

BRIEF DESCRIPTION OF THE DRAWINGS

Some implementations of the present disclosure are described with respect to the following figures.

FIG. 3 illustrates an example of object index metadata for objects stored in a data store, according to some examples.

FIG. 4 illustrates a sorted object index metadata based on sorting the object index metadata, according to some examples.

Figure 1:
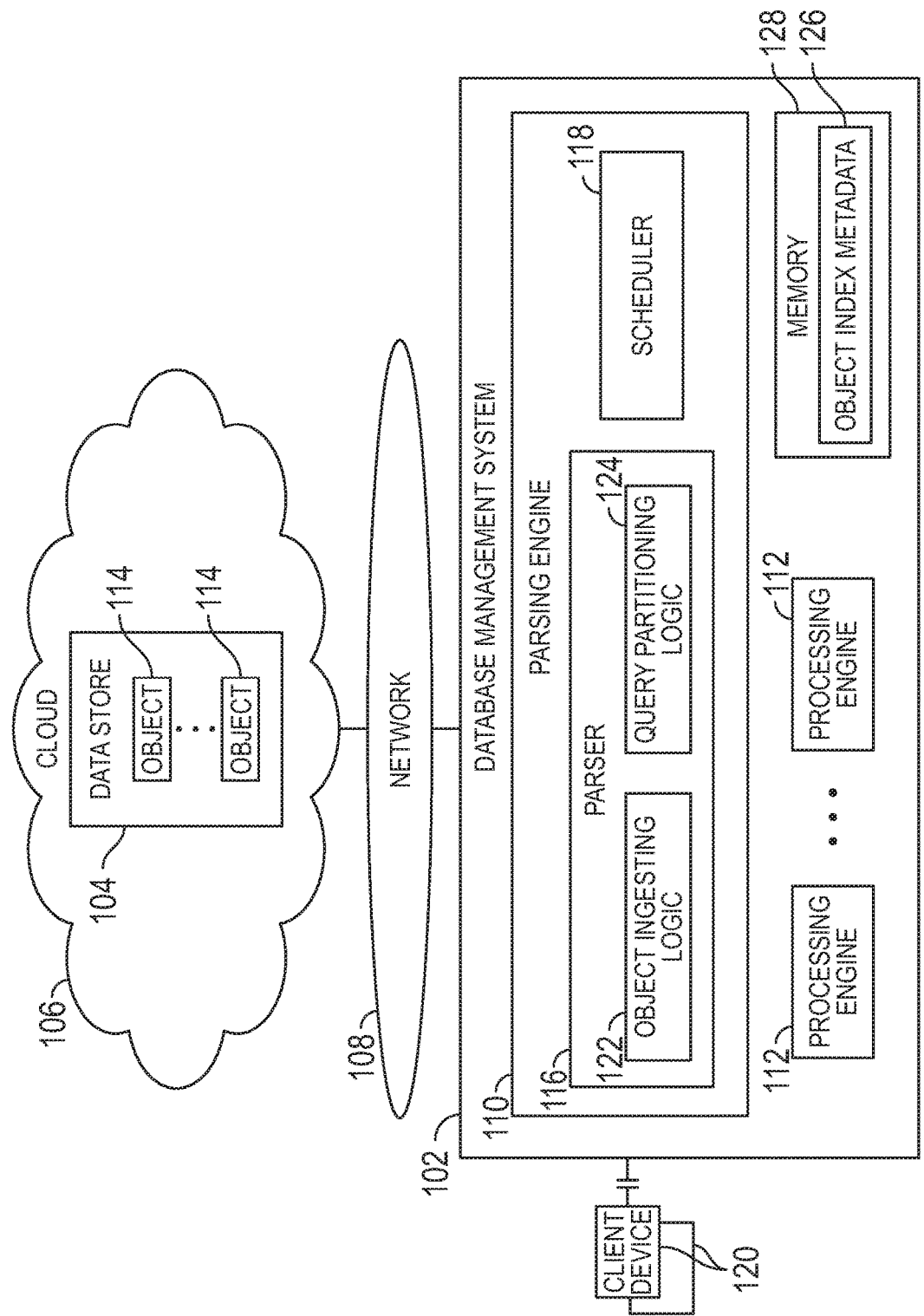
FIG. 1 is a block diagram of an example arrangement that includes a database management system and a logically disconnected data store, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

FIG. 1 is a block diagram of an example arrangement that includes a database management system (DBMS) 102 and a remote data store 104. In some examples, the data store 104 is an object store that stores objects 114. As used here, an "object" can refer to any separately identifiable or addressable unit of data.

In some examples, the data store 104 can be accessible in a cloud 106. A "cloud" can refer to any infrastructure, including computing, storage, and communication resources, that can be accessed remotely by user devices over a network, such as a network 108 shown in FIG. 1. Alternatively, the data store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

The DBMS 102 includes a parsing engine 110 that is able to process SQL queries, including data definition language (DDL) statements and data manipulation language (DML) statements.

In addition to the parsing engine 110, the DBMS 102 includes multiple processing engines 112.

As used here, an "engine" (e.g., the parsing engine 110 or a processing engine 112) can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The multiple processing engines 112 are able to execute in parallel with one another, and are able to access, in parallel, different data portions (e.g., different objects 114, different portions of objects 114) of the data store 104. Each processing engine 112 is considered a Unit Of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to a operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

Traditionally, a DBMS stores data in relational databases stored in a block-based storage, in which data is stored as blocks that are smaller in size than objects of object stores. For example, a block-based storage can include disk-based storage devices, solid state storage devices, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples, instead of coupling block-based storage to the DBMS 102, the DBMS 102 can work with just the data store 104, which can be provided in the cloud 106 or another remote computing environment. In such examples, local block-based storage is not used with the DBMS 102 to store relational tables. The objects 114 of the data store 104 can have variable sizes, and each object can have a size between 10 megabytes (MB) and 100 MB. In other examples, an object can have a smaller or larger size.

When responding to a SQL query, the DBMS 102 can access (write or read) data of the data store 104, rather than data in a relational table (or relational tables) of a local block-based storage. In some examples, accessing data of the data store 104 can have a higher I/O latency than accessing data of a local block-based storage. Note that the DBMS 102 can include caches to store a portion of the data for improving efficiency in data access. Data can be accessed from the caches of the DBMS 102 more quickly than data of the remote data store 104.

As explained further below, the arrangement according to FIG. 1 is according to a disconnected compute and storage architecture, in which a compute environment (including the DBMS 102) and a storage environment (including the data store 104) are logically disconnected from one another. Logical disconnection of the compute environment and the storage environment can refer to an arrangement in which data objects 114 (or other data portions) of the storage environment (including the data store 104) are not owned (assigned to) specific processing engines 112, but instead, the assignment of data objects 114 (or other data portions) of the storage environment to the processing engines 112 can change over time (such as from query to query). For example, to process a first query, a first object 114 may be assigned to a first processing engine 112, and a second object 114 may be assigned to a second processing engine 112. However, to process a second query, the first and second objects 114 may be assigned to the first processing engine 112, and other objects may be assigned to the second processing engine 112.

In a traditional DBMS that includes local storage, data stored in the local storage can be divided into multiple logical data subdivisions by hashing the data. The logical data subdivisions can be assigned to respective UOPs.

In the disconnected compute and storage architecture, using a hashing technique to create multiple logical data subdivisions assigned to respective UOPs may present various issues. First, if the number of logical data subdivisions is large, that may result in small objects 114 stored in the data store 104. A large number of small objects 114 in the data store 104 can result in storage fragmentation, which can be inefficient. Also, accessing small objects 114 in an object store may not be efficient, as object stores may be designed to employ larger objects. Another issue is that if there are too few logical data subdivisions, then processing skew may occur where one processing engine 112 has a larger workload than another processing engine 112 due to imbalance in the assignment of data portions to respective processing engines 112.

The data store 104 in some examples can be an object store, which can be one of any of various different types of object stores. For example, an object store can be according to any of the following: Simple Storage Service (S3) from AMAZON WEB SERVICES (AWS), Google Cloud Storage, Microsoft AZURE, and so forth. In alternative examples, the data store 104 does not have to be in a cloud, but rather can be within a data center or part of any other computing environment (e.g., on-premises computing environment).

The parsing engine 110 of the DBMS 102 can include a parser 116 and a scheduler 118. The parser 116 or scheduler 118 can be part of the hardware processing circuit of the parsing engine 110, or can include machine-readable instructions executable on the parsing engine 110.

The parser 116 receives database queries (such as SQL queries, load requests, etc.) submitted by one or more client devices 120, which may be coupled to the DBMS 102 over an interconnect (e.g., the network 108 or another link). The parser 116 parses each received database query, and generates executable steps for the parsed query. The parser 116 includes an optimizer (not shown) that generates multiple query plans in response to a query. The optimizer selects the most efficient query plan from among the multiple query plans. Each query plan includes a sequence of executable steps to perform to process the database query. The scheduler 118 sends the executable steps of the selected query plan to respective processing engines 112.

Each processing engine 112 manages access of data in respective objects 114 in the data store 104. Each processing engine 112 can perform the following tasks: inserts, deletes, or modifies contents of tables or other data records; creates, modifies, or deletes definitions of tables or other data records; retrieves information from definitions and tables or other data records; locks databases and tables or other data records; and so forth.

As used here, a "data record" can refer to any unit of data that can be written into the data store 104. For example, the data record can be in the form of a row of a table, a table, a materialized view, or any other piece of data. Each data record can have multiple attributes. In a table row, the multiple attributes can be the multiple columns of the table row. Each attribute is assigned a value in the corresponding data record.

In accordance with some implementations of the present disclosure, the parser 116 includes an object ingesting logic 122 and a query partitioning logic 124. The object ingesting logic 122 and the query partitioning logic 124 can be part of the parser 116 or outside of the parser 116. Alternatively, the object ingesting logic 122 and the query partitioning logic 124 can be separate from the parsing engine 110.

Although shown as two different logic, the object ingesting logic 122 and the query partitioning logic 124 can be part of the same logic in other examples.

The object ingesting logic 122 performs ingesting of data records into the objects 114 of the data store 104, from one or more sources, which can include one or more client devices 120 or any other source. Ingesting of data into the objects 114 of the data store 104 can be responsive to a write operation, a load operation, or any other operation that causes data to be inserted into the data store 104. During ingesting of data into the data store 104, the data is both horizontally organized and vertically organized based on use of one or more clustering attributes in the data.

A "clustering attribute" can refer to an attribute that has been specified for use in partitioning data records into multiple different partitions. In some examples, a single clustering attribute can be used to partition data records into multiple partitions. For example, data records with values of the clustering attribute that fall within a first range can be assigned to a first partition, data records with values of the clustering attribute that fall within a second range can be assigned to a second partition, and so forth.

In other examples, multiple clustering attributes can be used for organizing data records across multiple different partitions.

During ingesting of the data records into the data store 104, as data records are inserted into respective objects 114, metadata associated with the each object 114 into which a data record is inserted can be updated (if appropriate) to reflect new minimum and/or maximum values of the clustering attribute. The metadata associated with each object 114 is referred to as an object index metadata, which can be stored as object index metadata 126 in a memory 128 of the DBMS 102.

The memory 128 can be implemented using one or more memory devices. A memory device can include a volatile memory device, such as a dynamic random access memory (DRAM) device, a static random access memory (SRAM) device, and so forth. Alternatively, a memory device can include a nonvolatile memory device, such as a flash memory device, or any other type of nonvolatile memory device.

The minimum value of the clustering attribute for a given object 114 is the lowest clustering attribute value from among the clustering attribute values of the data records in the given object 114. For example, if there are N data records (e.g., N table rows) in the given object 114, each of the N data records includes a value of the clustering attribute. The minimum value of the clustering attribute for the given object 114 is the lowest clustering attribute value from among the clustering attribute values of the N data records.

Similarly, the maximum value of the clustering attribute for the given object 114 is the largest clustering attribute value from among the clustering attribute values of the data records in the given object 114.

When a new data record (having a particular clustering attribute value) is inserted into the given object 114, the object ingesting logic 122 can compare the particular clustering attribute value to the minimum and maximum values of the clustering attribute for the given object 114 contained in the object index metadata 126. If the particular clustering attribute value of the new data record is less than the minimum value of the clustering attribute for the given object 114, then the object ingesting logic 122 updates the object index metadata 126 to set the particular clustering attribute value of the new data record as the minimum value of the clustering attribute for the given object 114. Similarly, if the particular clustering attribute value of the new data record is greater than the maximum value of the clustering attribute for the given object 114, then the object ingesting logic 122 updates the object index metadata 126 to set the particular clustering attribute value of the new data record as the maximum value of the clustering attribute for the given object 114.

Horizontal organization of the data records during ingestion into the data store 104 refers to partitioning the data records such that different processing engines 112 insert different partitions of the data records into respective objects 114 of the data store 104.

Assume there are 1,000 orders to be inserted into table T1, where each order is identified by an order identifier (01D) attribute (which can range in value from 1 to 1,000) in this example. Also assume that each order has 5 line items, so that there are in total 5,000 data records (e.g., rows) in the 1,000 orders.

In the ensuing discussion, it is assumed that the OID attribute is the clustering attribute. It is also assumed that an object 114 in the data store 104 can hold 1,250 rows, and that there are two processing engines 112 (two UOPs).

If the data is horizontally partitioned at ingest time based on the OID attribute, then the lowest 500 orders (with OID attribute values between 1 to 500) are sent by the object ingesting logic 122 to the first processing engine 112, and the highest 500 orders (with OID attribute values between 501 to 1,000) are sent by the object ingesting logic 122 to the second processing engine 112.

Thus, the first processing engine 112 inserts the rows of orders 1 to 250 into object 1, and inserts the rows of orders 251 to 500 into object 2.

Similarly, the second processing engine 112 inserts the rows of orders 501 to 750 into object 3, and inserts the rows of orders 751 to 1,000 into object 4.

Vertical organization of the data records at ingest time can refer to sorting, by each processing engine 112, the data records according to the clustering attribute. In the foregoing example, the first processing engine 112 sorts the rows of orders 1-500 by the OID attribute values, and inserts the sorted rows into objects 1 and 2, and the second processing engine 112 sorts the rows of orders 501-1,000 by the OID attribute values, and inserts the sorted rows into objects 3 and 4.

In other examples, during ingesting of data records into the data store 104, the horizontal and vertical organization of the data records can be based on multiple clustering attributes. In examples where multiple clustering attributes are used, the multiple clustering attributes can be mapped to a single sort key that includes the multiple clustering attributes. The values of the sort key are then used for performing the horizontal and vertical organization of data records.

Once data records are ingested into the data store 104 (i.e., inserted into the objects 114), queries to access the data records can be received by the parsing engine 110. The queries can include a query that reads data of the objects 114, a query that causes a modification of values of data records, a query that causes a specific operation (e.g., an aggregation operation, a join operation, an ordered analytic operation, etc.) to be performed.

In response to the query, the query partitioning logic 124 can perform range partitioning and assign objects to respective processing engines 112 based on the range partitioning, in accordance with some implementations of the present disclosure.

In some examples, different range partitioning can be performed in response to receipt of each query. Thus, it is possible that for different queries, the ownership of objects can change, where an "ownership" of an object can refer to which processing engine 112 is assigned to process the object in response to the query. Thus, for different queries, the ownership of the objects can change among the processing engines 112.

For example, a first query can specify: SELECT OID, SUM(Quantity) FROM T1 WHERE OID>0 GROUP BY 1.

In the first query, an aggregate function SUM is performed on the quantity attribute of the rows of table T1, to sum the values of the Quantity attribute. The "GROUP BY 1" clause performs a group-by operation on a specific attribute. The predicate OID>0 specifies that the selected rows are those with OID greater than zero.

For the first query, all 1,000 orders of table T1, which were previously inserted into first, second, third, and fourth objects 114, satisfy the predicate OID>0. To process the first query, the query partitioning logic 124 assigns objects 1 and 2 to the first processing engine 112, and assigns objects 3 and 4 to the second processing engine 112. The first processing engine 112 access the objects 1 and 2 and performs the operation of the first query on the data records of objects 1 and 2, and the second processing engine 112 access the objects 3 and 4 and performs the operation of the first query on the data records of objects 3 and 4.

At another time, a second query can be received, where the second query is as follows: SELECT OID, SUM(Quantity) FROM T1 WHERE OID≤500 GROUP BY 1.

In the second query, the predicate OID≤500 specifies that the selected rows are those with OID less than or equal 500. In this example, the rows in objects 1 and 2 satisfy the predicate, but the rows in objects 3 and 4 do not satisfy the predicate. As a result, objects 1 and 2 are accessed, but not objects 3 and 4. In this case, the query partitioning logic 124 assigns object 1 to the first processing engine 112, and assigns object 2 to the second processing engine 112.

Thus, at query time, the ownership of objects by the processing engines 112 can change for different queries.

In the disconnected compute and storage architecture, traditional techniques do not allow UOP local relational operations; join, aggregation etc. For example, a query can specify: SELECT OID, SUM(Quantity) FROM T1 WHERE OID>0 GROUP BY 1. For the aggregation (SUM) to be performed in a UOP local manner would require that all of the OIDs with the same value be collocated to the same UOP.

In an example discussed further above, rows of orders 1 to 250 have been inserted into object 1, rows of orders 251 to 500 have been inserted into object 2, rows of orders 501 to 750 have been inserted into object 3, and rows of orders 751 to 1,000 have been inserted into object 4.

Assume further that a subsequent insert has inserted object 5 with orders 1-250.

At query time, the query partitioning logic 124 can assign objects 1-5 to respective processing engines using techniques as discussed above. Once data of the objects have been read into the processing engines, there does not have to be any network transfer (redistribution) of the data once the has been read by a processing. For large datasets, data redistribution can be a significant operation.

The benefits apply to other types of local operations, such as local join operations.

Figure 2:
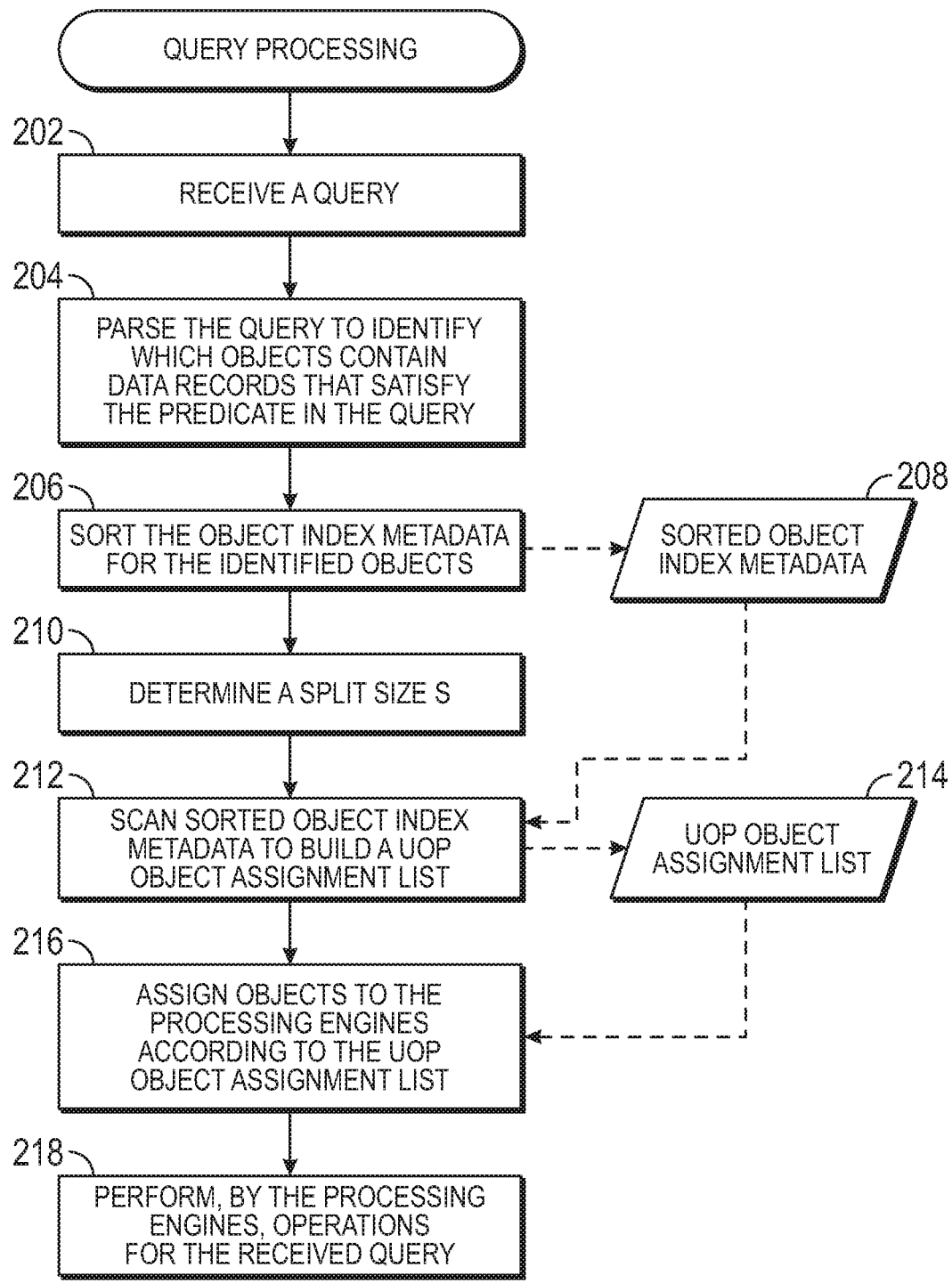
FIG. 2 is a flow diagram of a process according to some implementations of the present disclosure.

FIG. 2 is a flow diagram of query processing that can be performed by the parsing engine 110 of FIG. 1. The query partitioning logic 124 receives (at 202) a query, such as from a client device 120.

The parser 116 parses (at 204) the query to identify which objects 114 in the data store 104 contain data records that satisfy the predicate in the query.

The query partitioning logic 124 sorts (at 206) the object index metadata 126 for the identified objects based on the clustering attribute. In the example discussed in relation with FIG. 2, it is assumed that there is just one clustering attribute. In other examples, there can be multiple clustering attributes.

The sorting of the object index metadata 126 produces a sorted object index metadata 208, which can be stored in the memory 128 of FIG. 1, or a different memory.

An example object index metadata 126 is shown in FIG. 3. The example object index metadata 126 includes 10 entries 302-1 to 302-10 for 10 respective objects (which can be the objects identified at 206 in FIG. 3).

The first entry 302-1 is for object 1, and the first entry 302-1 contains the minimum value and the maximum value of the clustering attribute. The remaining entries 302-2 to 302-10 contain respective minimum and maximum values of the clustering attribute of corresponding objects 2-10.

In some examples, the sorting of the object index metadata 126 is based on a midpoint value of the clustering attribute in the objects. The midpoint value is the midpoint between the minimum value and the maximum value of the clustering attribute of a respective object. For example, the midpoint value of the clustering attribute for object 1 is 101, which is computed from (1+201)/2. The midpoint value for object 2 is 305, which is computed from (202+408)/2. The midpoint values for the other objects are similarly computed.

Sorting based on the midpoint values of the clustering attribute can produce a sorted order of the objects according to an ascending order (for example) of the clustering attribute. FIG. 4 shows a sorted object index metadata 208 produced by sorting of the object index metadata 302. Entries 402-1 to 402-10 of the sorted object index metadata 208 are sorted based on midpoint clustering attribute values for respective objects 1-10. In the example of FIG. 1, the entry 402-1 of the sorted object index metadata 208 is for object 1, the entry 402-2 of the sorted object index metadata 208 is for object 6, the entry 402-3 of the sorted object index metadata 208 is for object 2, and so forth as shown in FIG. 4.

Referring again to FIG. 2, the query partitioning logic 124 determines (at 210) a split size S, which is equal to the number of identified objects divided by the number of processing engines 112. Thus, in an example where there are two processing engines 112 and the number of identified objects is 10, the split size S is equal to 5 (10/2). The split size determines the number of objects to assign to each processing engine, in this case 5. A goal of determining the split size is to assign an equal amount of data (or nearly equal amount of data) to each processing engine 112.

The query partitioning logic 124 scans (at 212) the sorted object index metadata 402 to build a UOP object assignment list 214, which can be stored in the memory 128 of FIG. 1, or a different memory. The UOP object assignment list 214 assigns objects to respective UOPs (processing engines 112 in FIG. 1). Although referred to as a "list," in other examples, other types of UOP object assignment data structures can be employed to assign objects to respective UOPs.

In the example shown in FIG. 4, the UOP object assignment list 214 can be included as part of the sorted object index metadata 208. In other examples, the UOP object assignment list 214 can be separate from the sorted object index metadata 208.

The UOP object assignment list 214 includes indications that assign respective objects to corresponding processing engines 112. For example, in the UOP object assignment list 214, a UOP attribute 404 if set to the value of "1" indicates that the object is assigned to a first processing engine 112, and the UOP attribute 404 if set to the value of "2" indicates that an object is assigned to a second processing engine 112.

In some examples, the UOP object assignment list 214 also includes a Duplicate attribute 406, which indicates whether or not an object can reside on multiple UOPs (or multiple processing engines 112 in the context of FIG. 1). In the UOP object assignment 214, a Duplicate value of "N" indicates that the object is not located on more than one processing engine 112, while a Duplicate value of "Y" indicates that the object can be on multiple processing engines 112. In the example of FIG. 4, objects 1, 6, 2, 7, 4, 9, 5, and 10 are assigned to just one processing engine 112. However, objects 3 and 8, which are associated with the Duplicate value of "Y", are assigned to more than one processing engine 112. An object that is assigned to multiple processing engines 112 can mean that a first portion of the object is assigned to a first processing engine, a second portion of the object is assigned to a second processing engine, and so forth.

Figure 5:
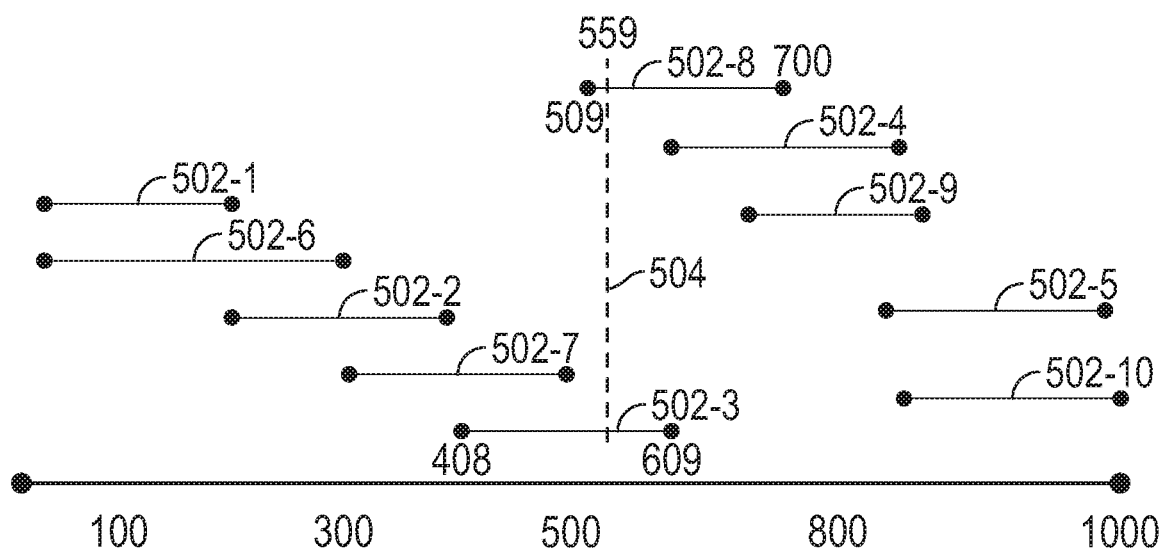
FIG. 5 is a graph illustrating a sorted object index metadata according to some examples.

FIG. 5 illustrates a graph that graphically shows the sorted object index metadata 204. More specifically, FIG. 5 shows the clustering attribute range for each object. The horizontal axis of FIG. 5 represents values of the clustering attribute.

Clustering attribute ranges 502-1 to 502-10 are shown in FIG. 5, where the clustering attribute ranges 502-1 to 502-10 correspond to objects 1-10, respectively. The clustering attribute range 502-1 represents the range of values (between a minimum value and a maximum value) of the clustering attribute of object 1, the clustering attribute range 502-2 represents the range of values of the clustering attribute of object 2, and so forth.

The clustering attribute ranges 502-1 to 502-10 are arranged in ascending order from left to right along the horizontal axis of the graph shown in FIG. 5. In the example of FIG. 5, an overlap range starts at the minimum value (509) of the clustering attribute range 502-8 for object 8, and ends at the maximum value (609) of the clustering attribute range 502-3 for object 3. The midpoint value between 509 and 609 is 559, which is represented by a vertical line 504 in FIG. 5. More generally, the vertical line 504 represents a split point between clustering attribute values for the first processing engine, and clustering attribute values for the second processing engine. In general, there are N−1 split points, where N represents the number of UOPs (processing engines). Each split point can have one or more objects that cross the split point.

The clustering attribute range 502-3 and the clustering attribute range 502-8 for objects 3 and 8, respectively, both cross the split point represented by vertical line 504. Thus, for object 8, data records in object 8 that have clustering attribute values that are less than or equal to 559 are processed by the first processing engine, and data records of object 8 having clustering attribute values greater than 559 are processed by the second processing engine. Similarly, for object 3, data records having clustering attribute values less than or equal to 559 are processed by the first processing engine, and data records having clustering attribute values greater than 559 are processed by the second processing engine.

In further examples, if the sorted object index metadata 208 is large (e.g., includes a number of entries that exceed a specified threshold), then sampling of the entries of the object index metadata 126 can be performed. For example, if 10% sampling is applied, then 10% of the entries of the object index metadata 126 are sorted to produce the sorted object index metadata 208, which includes just 10% of the entries of the object index metadata 126. Using sampling can reduce processing overhead associated with performing the range partitioning according to some implementations of the present disclosure.

As further shown in FIG. 2, the query partitioning logic 124 assigns (at 216) objects to the processing engines 112 based on the UOP object assignment list 214.

Each respective processing engine 112 then performs (at 218) the respective operations for the query received (at 202) on data records of the objects (or object portions) assigned to the respective processing engine 112.

Figure 6:
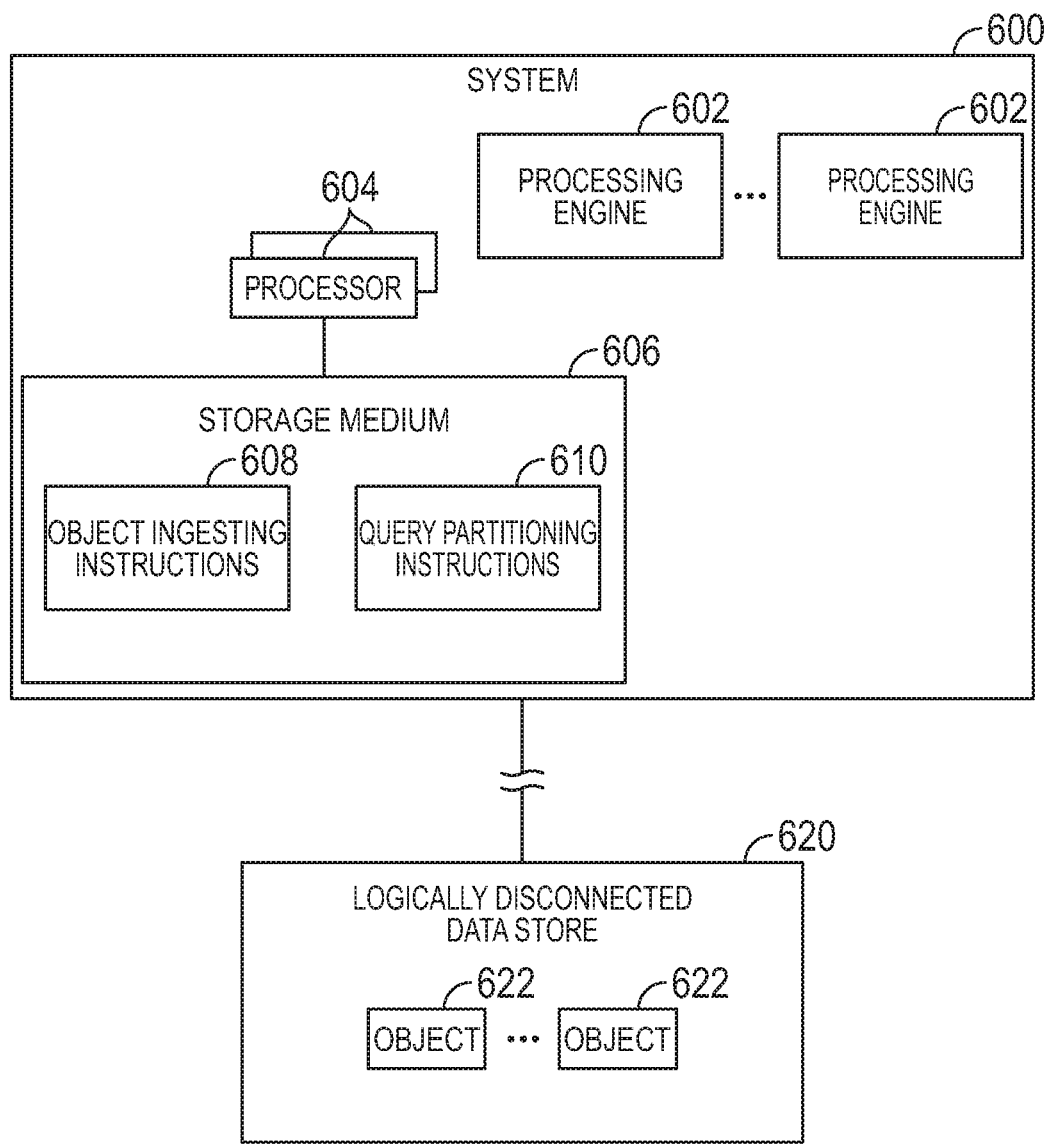
FIG. 6 is a block diagram of an example system according to some implementations of the present disclosure.

FIG. 6 is a block diagram of an example system 600, such as the DBMS 102 of FIG. 1, according to some implementations of the present disclosure.

The system 600 includes multiple processing engines 602 (similar to 112 in FIG. 1) to access data in a logically disconnected data store 620 (e.g., similar to 104 in FIG. 1). The logically disconnected data store 620 is part a disconnected compute and storage architecture as discussed above.

The compute environment of the disconnected compute and storage architecture includes the processing engines 602, one or more hardware processors 604, and a non-transitory machine-readable or computer-readable storage medium 606 storing machine-readable instructions executable on the one or more hardware processors 604 to perform various tasks according to some implementations of the present disclosure. In some examples, the one or more processors 604 and the storage medium 606 can implement the parsing engine 110 of FIG. 1.

The machine-readable instructions stored in the storage medium 606 include object ingesting instructions 608 and query partitioning instructions 610, which can perform tasks similar to those of the object ingesting logic 122 and the query partitioning logic 124 of FIG. 1.

In response to a query for data in the data store, the query partitioning instructions 610 are executable to access metadata (e.g., 126 in FIG. 1) of objects 622 stored in the data store 620. The metadata includes information of a respective range of values (as defined by a minimum value and a maximum value) of at least one clustering attribute in data contained in each respective object of the objects 622 in the data store 620.

The query partitioning instructions 610 are executable to partition the objects 622 across the multiple processing engines 602 based on the information of the respective ranges of values of the at least one clustering attribute in the data contained in the objects 622.

The query partitioning instructions 610 are executable to assign, based on the partitioning, the objects 622 to respective processing engines 602.

In some examples, a first object can be assigned to a respective single processing engine 602, while a second object can be assigned to multiple processing engines 602.

The query partitioning instructions 610 are executable to determine at least one split point (e.g., the split point 504 in FIG. 5) between partitions to which the objects are assigned, where each respective partition includes a respective number of objects. The partitioning of the objects across the multiple processing engines is based on the at least one split point.

The storage medium 606 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
   a plurality of processing engines to access data in a logically disconnected data store;
   one or more processors;
   a non-transitory storage medium storing instructions executable on the one or more processors to:
      in response to a query for data in the data store, access metadata of objects stored in the data store, the metadata including information of a respective range of values of at least one clustering attribute in data contained in each respective object of the objects,
      partition the objects across the plurality of processing engines based on the information of the respective ranges of values of the at least one clustering attribute in the data contained in the objects, and
      assign, based on the partitioning, the objects to respective processing engines of the plurality of processing engines.

2. The system of claim 1, wherein the assigning comprises assigning a first object of the objects to multiple processing engines of the plurality of processing engines.

3. The system of claim 2, wherein the instructions are executable on the one or more processors to:
   determine at least one split point between partitions to which the objects are assigned, wherein each respective partition of the partitions includes a respective number of objects,
   wherein the partitioning of the objects across the plurality of processing engines is based on the at least one split point.

4. The system of claim 3, wherein the instructions are executable on the one or more processors to:
   determine the respective number of objects in each respective partition of the partitions based on a total number of objects to be accessed for the query and a quantity of the plurality of processing engines.

5. The system of claim 3, wherein the instructions are executable on the one or more processors to:
   assign the first object to the multiple processing engines responsive to a range of values of the at least one clustering attribute in data contained in the first object crossing a split point between multiple partitions of the partitions.

6. The system of claim 2, wherein the assigning comprises assigning a second object of the objects to a single processing engine of the plurality of processing engines.

7. The system of claim 1, wherein the query is a first query, and the instructions are executable on the one or more processors to:
   in response to a second query for data in the data store, access the metadata of the objects stored in the data store,
   further partition, for the second query, a subset of the objects across the plurality of processing engines based on the metadata, and
   further assign, based on the further partitioning, the subset of the objects to respective processing engines of the plurality of processing engines.

8. The system of claim 1, wherein the instructions are executable on the one or more processors to:
   during ingestion of the objects into the data store, organize the objects across the plurality of processing engines according to the at least one clustering attribute.

9. The system of claim 8, wherein the instructions are executable on the one or more processors to:
   during the ingestion of the objects into the data store, sort, by each respective processing engine of the plurality of processing engines, data in a subset of the objects associated with the respective processing engine.

10. A non-transitory machine-readable storage medium comprising instructions that upon execution cause a system to:
    insert data records into objects of a data store in a logically disconnected compute and storage environment;
    in response to a query for data in the data store, access metadata of the objects stored in the data store, the metadata including information of a respective range of values of at least one clustering attribute in data records contained in each respective object of the objects;
    partition the objects across a plurality of processing engines based on the information of the respective ranges of values of the at least one clustering attribute in the data records contained in the objects; and
    assign, based on the partitioning, the objects to respective processing engines of the plurality of processing engines.

11. The non-transitory machine-readable storage medium of claim 10, wherein the respective range of values of the at least one clustering attribute is defined by a minimum value of the at least one clustering attribute and a maximum value of the at least one clustering attribute in the data records contained in the respective object.

12. The non-transitory machine-readable storage medium of claim 10, wherein the instructions that upon execution cause the system to:
    sort the metadata based on the ranges of values of the at least one clustering attribute in the data records contained in the objects, to produce sorted metadata,
    wherein the partitioning is based on the sorted metadata.

13. The non-transitory machine-readable storage medium of claim 12, wherein the sorting of the metadata is based on a midpoint value of each respective range of values of the at least one clustering attribute.

14. The non-transitory machine-readable storage medium of claim 10, wherein the assigning comprises assigning a first object of the objects to multiple processing engines of the plurality of processing engines.

15. The non-transitory machine-readable storage medium of claim 10, wherein the assigning comprises assigning a second object of the objects to a single processing engine of the plurality of processing engines.

16. The non-transitory machine-readable storage medium of claim 10, wherein the inserting of data records into the objects of the data store comprises horizontally partitioning the data records across the plurality of processing engines based on the at least one clustering attribute.

17. The non-transitory machine-readable storage medium of claim 16, wherein the inserting of data records into the objects of the data store further comprises sorting, by each respective processing engine of the plurality of processing engines, data records of one or more objects assigned to the respective processing engine according to the at least one clustering attribute.

18. A method performed by a system comprising a hardware processor, comprising:

storing data in a logically disconnected data store;

in response to a query for data in the data store, accessing metadata of objects stored in the data store, the metadata including information of a respective range of values of at least one clustering attribute in data contained in each respective object of the objects;

partitioning the objects across a plurality of processing engines based on the information of the respective ranges of values of the at least one clustering attribute in the data contained in the objects; and assigning, based on the partitioning, the objects to respective processing engines of the plurality of processing engines.

19. The method of claim 18, wherein the data store is an object store that stores the objects in a cloud.

20. The method of claim 18, further comprising:

sorting the metadata based on the ranges of values of the at least one clustering attribute in data records contained in the objects, to produce sorted metadata, wherein the partitioning is based on the sorted metadata.

* * * * *